(12) United States Patent
Barfoot et al.

(10) Patent No.: US 10,120,101 B2
(45) Date of Patent: Nov. 6, 2018

(54) METHODS AND SYSTEMS USING AN OPTICAL RECEIVER AND ELECTRO-OPTIC METHODS TO TRANSMIT DATA FROM INTEGRATED COMPUTATIONAL ELEMENTS

(71) Applicant: Halliburton Energy Services, Inc., Houston, TX (US)

(72) Inventors: David Andrew Barfoot, Houston, TX (US); Tasneem Ammar Mandviwala, Katy, TX (US); Etienne M. Samson, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/506,717

(22) PCT Filed: Jul. 27, 2015

(86) PCT No.: PCT/US2015/042273
§ 371 (c)(1),
(2) Date: Feb. 24, 2017

(87) PCT Pub. No.: WO2017/019019
PCT Pub. Date: Feb. 2, 2017

(65) Prior Publication Data
US 2017/0248734 A1    Aug. 31, 2017

(51) Int. Cl.
| | | |
|---|---|---|
| H04B 10/00 | (2013.01) | |
| G01V 8/10 | (2006.01) | |
| G01J 3/02 | (2006.01) | |
| G01J 3/28 | (2006.01) | |
| E21B 47/12 | (2012.01) | |
| E21B 49/00 | (2006.01) | |

(Continued)

(52) U.S. Cl.
CPC ............. *G01V 8/10* (2013.01); *E21B 47/12* (2013.01); *E21B 49/00* (2013.01); *E21B 49/08* (2013.01); *G01J 3/0218* (2013.01); *G01J 3/28* (2013.01); *G01J 2003/283* (2013.01)

(58) Field of Classification Search
CPC ........ H04B 10/40; H04B 10/50; H04B 10/80; H04B 10/801; E21B 47/123
See application file for complete search history.

(56) References Cited

U.S. PATENT DOCUMENTS

| | | |
|---|---|---|
| 5,712,932 A | 1/1998 | Alexander et al. |
| 6,052,056 A | 4/2000 | Burns et al. |

(Continued)

FOREIGN PATENT DOCUMENTS

WO    WO-2014/105071 A1    7/2014

*Primary Examiner* — Daniel Dobson
(74) *Attorney, Agent, or Firm* — McGuireWoods LLP

(57) ABSTRACT

An optical link including an optical computing device having an integrated computational element (ICE), and a method for using the device to perform a remote measurement of a characteristic of a sample with the optical computing device are provided. The optical computing device provides an optical computing signal proportional to a characteristic of a sample from an interacted light provided to the ICE. The device includes an optical transducer to provide a modulating signal based on the optical computing signal and a modulator to modulate a first portion of a transmission light in an optical waveguide based on the modulating signal.

17 Claims, 9 Drawing Sheets

(51) Int. Cl.
*E21B 49/08* (2006.01)
*H04J 14/00* (2006.01)

(56) References Cited

U.S. PATENT DOCUMENTS

| | | |
|---|---|---|
| 2005/0134861 A1 | 6/2005 | Kringlebotn et al. |
| 2006/0152383 A1 | 7/2006 | Yamate et al. |
| 2010/0277714 A1* | 11/2010 | Pedersen ............... G01S 7/4811 356/28 |
| 2014/0175271 A1* | 6/2014 | Samson ................ E21B 47/123 250/264 |

* cited by examiner

METHODS AND SYSTEMS USING AN OPTICAL RECEIVER AND ELECTRO-OPTIC METHODS TO TRANSMIT DATA FROM INTEGRATED COMPUTATIONAL ELEMENTS

BACKGROUND

In the field of oil and gas exploration and extraction, multiple measurements are performed near from or at the bottom of the borehole. Many applications up to date perform the data processing at, or near from, the measurement location, so that the processed values are transmitted upstream by acoustic or electrical pulses. While these approaches may reduce the cost of signal transfer mechanisms and logistics, they are highly susceptible to environmental conditions, noise, interference, and are typically slow as the bandwidth of the electrical or acoustical channels is limited.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

In the figures, elements or steps having the same or similar reference numerals have the same or similar description and configuration, unless stated otherwise.

DETAILED DESCRIPTION

Figure 1:
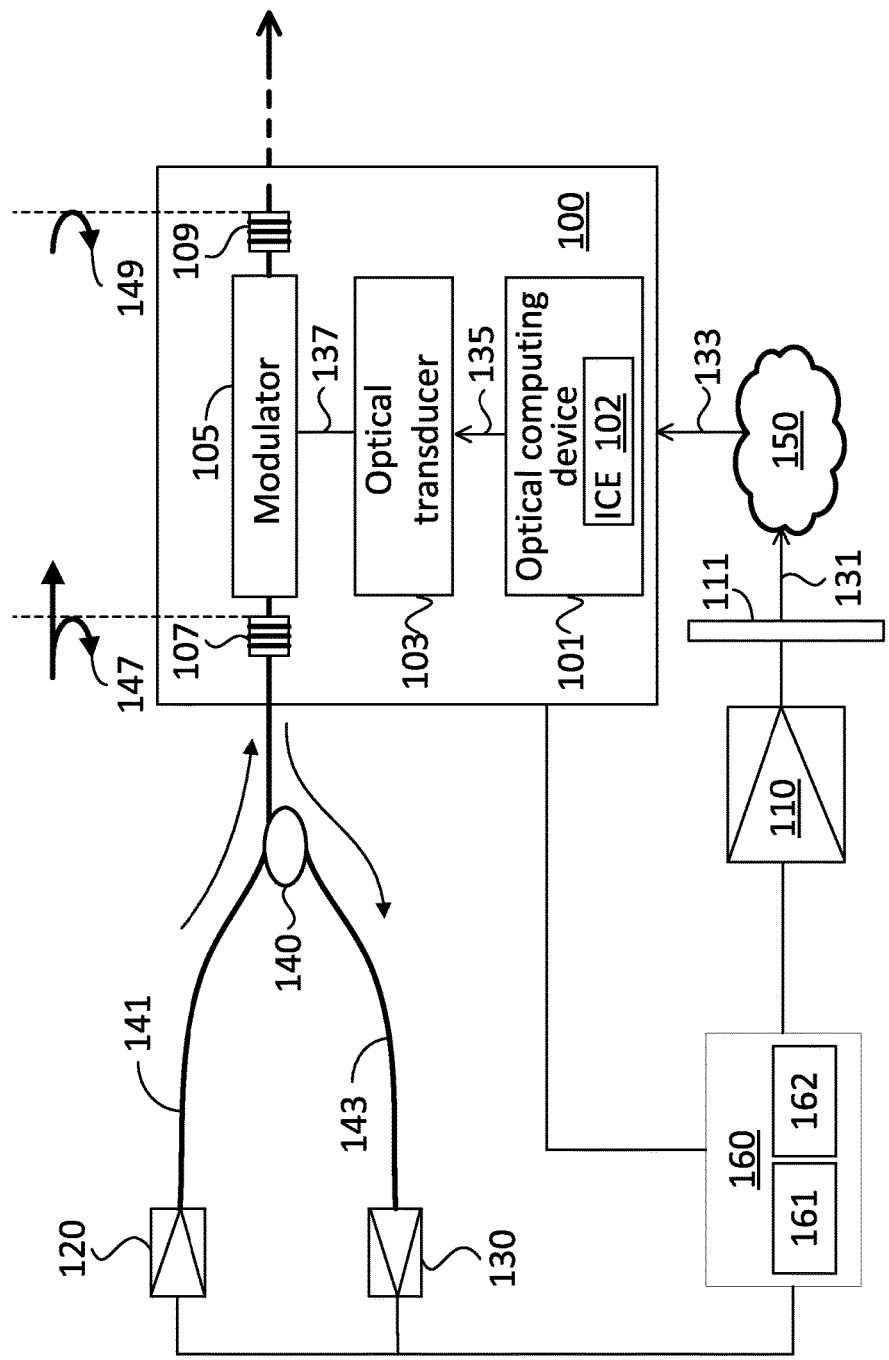
FIG. 1 illustrates an optical link including an optical computing device for remote measurement of the characteristic of a sample.

The present disclosure relates to optical links to transmit signals from optical computing devices using integrated computational elements. More specifically, the present disclosure relates to optical links using electro-optical devices to transmit signals from remotely located optical computing devices to surface instrumentation and controllers in a borehole application for the oil and gas industry.

Embodiments consistent with the present disclosure use optical computing devices with at least one an integrated computational element (ICE) to detect compounds or fluid characteristics in a sample. Optical computing devices as disclosed herein monitor in real time properties of downhole fluids and products, and convey the results to the surface using optical telecommunication methods instead of electronics or acoustics. The optical telecommunication methods may include an all-optical receiver arranged at a surface location. For example, in some embodiments an electro-optic phase modulator converts an electrical signal generated by a thermopile in an optical computing device to an optical signal in a telecommunications wavelength band at or near the measurement location downhole. The optical signal is transmitted via optical fiber to an interrogation system located on the surface.

The advantages of an all-optical method as disclosed herein include faster data rates, and the reduction/elimination of electrical noise. Also, embodiments consistent with the present disclosure eliminate the need for electrical amplifiers, repeaters and associated power supplies, given the low power loss of optical telecommunication channels. Furthermore, embodiments consistent with the present disclosure allow for a distributed sensor capability using time-division-multiplexing (TDM) and wavelength-division-multiplexing (WDM) capabilities of optical telecommunication schemes.

Embodiments consistent with the present disclosure involve the detection of modified light with a detector. The intensity of the modified light is proportional to the concentration or a value of a characteristic of interest of the sample. A challenge in many applications, such as those at the bottom of a borehole, is to convey the detector output (and thereby the key data or information) to the surface, which may be several kilometers (Km) away from the point of measurement. Presently, this is typically implemented using electronics, amplifiers, physical cables, or even acoustic devices. These methods can introduce noise and, therefore, inaccuracy in the transmitted information. Additionally, these methods require power and may be a challenge to implement physically. In this disclosure, methods are disclosed to achieve an all-optical receiver, such that electrical signals derived from a remote detector are used to modulate an optical signal originating from the surface whereby the modulated optical signal is returned from the remote optical modulator to the surface through an optical fiber and detected by the all-optical receiver at the surface.

Embodiments of the present disclosure include an all-optical sensing system for use in oil and gas extraction and exploration applications. Some of the features include the ability to perform remote sensing using optical waveguide telecommunications technology. Accordingly, embodiments consistent with the present disclosure provide improved measurement accuracy due to the low detection noise floor, low transmission loss, and high channel capacity in the telecommunications bands. In embodiments disclosed herein, the multiplexing capability of TDM and WDM schemes enable the use of multiple sensors distributed along an oil or gas pipeline, or a borehole. Optical computing devices in an optical sensing system using optical links as described above may be deployed for long periods of time, or even permanently, due to the ruggedness of optical telecommunications technology. Furthermore, embodiments consistent with the present disclosure may substantially reduce or even eliminate the implementation of complex downhole electronics. Embodiments consistent with the present disclosure avoid computational errors, SNR deterioration, and the short lifetime before failure of complex electronic circuitry at the high temperatures of the borehole, especially at or close to the bottom, which can reach upwards from 200° C.

Optical computing devices, also commonly referred to as "opticoanalytical devices," can be used to analyze and monitor a substance in real time. Such optical computing devices will often employ an integrated computational element (ICE). An ICE as disclosed herein is an element that optically interacts with a substance to determine quantitative and/or qualitative values of one or more physical or chemical properties of the substance. The ICE may include multilayered interference elements designed to operate over a continuum of wavelengths in the electromagnetic spectrum from the UV to mid-infrared (MIR) ranges, or any sub-set of that region. Electromagnetic radiation that optically interacts with the ICE is modified to be readable by a detector such that an output of the detector can be correlated to the physical or chemical property or "characteristic" of the substance being analyzed.

As used herein, the term "characteristic" refers to a chemical, mechanical, or physical property of a substance. A characteristic of a substance may include a quantitative or qualitative value of one or more chemical constituents or compounds present therein, or any physical property associated therewith. Such chemical constituents and compounds may be referred to herein as "analytes." Illustrative characteristics of a substance that can be monitored with the optical computing devices described herein can include, for example, chemical composition (e.g., identity and concentration in total or of individual components), phase presence (e.g., gas, oil, water, etc.), impurity content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures, etc), and the like.

As used herein, the term "electromagnetic radiation" refers to radio waves, microwave radiation, infrared and near-infrared radiation, visible light, ultraviolet light, X-ray radiation and gamma ray radiation.

As used herein, the term "optical computing device" refers to an optical device that is configured to receive an input of electromagnetic radiation associated with a substance and produce an output of electromagnetic radiation from a processing element arranged within the optical computing device. The processing element may be, for example, an integrated computational element (ICE), also known as a multivariate optical element (MOE). The electromagnetic radiation that optically interacts with the processing element is changed so as to be readable by a detector, such that an output of the detector can be correlated to a particular characteristic of the substance. The output of electromagnetic radiation from the processing element can be reflected, transmitted, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid, for example via fluorescence, luminescence, Raman, Mie, and/or Raleigh scattering, can also be monitored by optical computing devices.

As used herein, the term "optically interact" or variations thereof refers to the reflection, transmission, scattering, diffraction, or absorption of electromagnetic radiation either on, through, or from one or more processing elements (i.e., ICE or MOE components) or a substance being analyzed by the processing elements. Accordingly, optically interacted light refers to electromagnetic radiation that has been reflected, transmitted, scattered, diffracted, or absorbed by, emitted, or re-radiated, for example, using a processing element, but may also apply to interaction with a substance.

FIG. 1 illustrates an optical link 100 including an optical computing device 101 for remote measurement of the characteristic of a sample 150. Optical computing device 101 includes an integrated computational element (ICE) 102, and provides an optical computing signal 135 proportional to a characteristic of sample 150 from an interacted light 133 provided to ICE 102. Interacted light 133 is the result of the optical interaction of illumination light 131 and sample 150. Illumination light 131 is provided by a light source 110, and filtered by a spectral element 111. In at least one embodiment, spectral element 111 may also comprise an ICE.

Optical link 100 includes an optical transducer 103 that receives the optical computing signal 135 and provides a modulating signal 137 to a modulator. Modulating signal 137 is based on the value or intensity of optical computing signal 135. In some embodiments, optical link 100 may further include a modulator 105 to modulate a first portion 149 of a transmission light in an optical waveguide 141 based on modulating signal 137. In some embodiments, optical transducer 103 includes at least one of an electro-optical transducer or an all-optical transducer. In embodiments where optical transducer 103 is an all-optical transducer, modulating signal 137 is an optical signal, such as optical computing signal 135.

In some embodiments, optical link 100 includes an input coupler 107 that provides the first portion 149 of transmission light to modulator 105 and a second portion 147 of transmission light back to the optical waveguide 141. Optical link 100 may also include an output coupler 109 that provides the first portion of the transmission light 149 back through modulator 105 and out of optical link 100 through input coupler 107. In some embodiments, input coupler 107 and output coupler 109 are identical Fiber Bragg Gratings (FBGs) having a partial transmission rate and a partial reflection rate.

In some embodiments, modulating signal 137 is a voltage and modulator 105 is an electro-optic phase retarder having an index of refraction that changes according to the voltage (e.g., a voltage provided by a thermopile detector in optical computing device 101). For example, modulator 105 may include an electro-optic crystal such as lithium-niobate (LiNbO3) or potassium dihydrogen phosphate (KDP). Modulator 105 creates a phase delay in the first portion 149 of transmission light relative to the second portion 147 of the transmission light based in the input sign. The second portion 147 of the transmission light interferes with the first portion 149 of the transmission light at input coupler 107, thus generating an interference pattern traveling back through optical waveguide 141 into optical waveguide 143 through splitter 140. The interference pattern between first portion 149 and second portion 147 of the transmission light is measured remotely by a photodetector 130.

In some embodiments, optical waveguide 141 comprises or otherwise includes one or more optical fibers. The optical waveguide 141 may have a low loss coefficient in a telecommunications wavelength band, and the transmission light has a wavelength in the telecommunications wavelength band. A telecommunications wavelength band may be the O-band (approximately 1260 nm-1360 nm), the E-band (approximately 1360 nm-1460 nm), the S-band (approximately 1460 nm-1530 nm), the C-band (approximately 1530 nm-1565 nm), the L-band (approximately 1565 nm-1625 nm), or the U-band (approximately 1625 nm-1675 nm).

Other wavelength bands in the near infrared (NIR) region (approximately 850 nm-2500 nm) may be used, depending on the specific desires and configurations for use of optical link 100. Furthermore, in some embodiments, at least one of input coupler 107 and output coupler 109 is a wavelength selective element with a partial reflection rate that is higher for a first portion of transmission light 149 having a wavelength within a pre-selected band.

Figure 2:
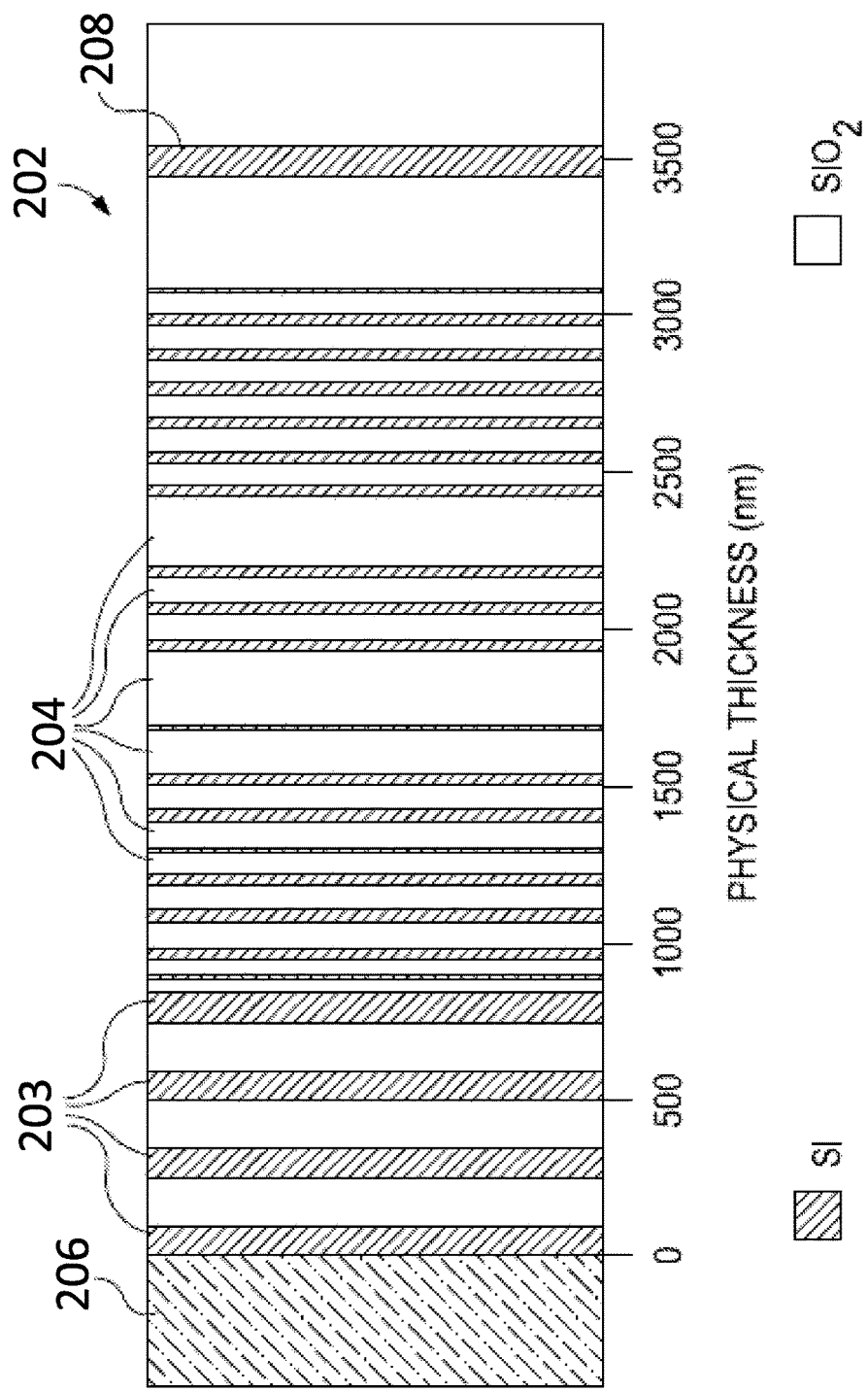
FIG. 2 illustrates a cross-sectional view of an integrated computational element for use in an optical computing device.

FIG. 2 illustrates a cross-sectional view of an exemplary integrated computational element (ICE) 202. The ICE 202 may be similar to or the same as the ICE 102 of FIG. 2 and, therefore, may be used in optical computing device 101 of FIG. 1. As illustrated, ICE 202 may include a plurality of alternating layers 203 and 204, such as silicon (Si) and $SiO_2$ (quartz), respectively. In general, layers 203, and 204 include materials whose index of refraction is high and low, respectively. Other examples of materials for use in layers 203 and 204 might include niobia and niobium, germanium and germania, MgF, SiO, and other high and low index materials known in the art. Layers 203, 204 may be strategically deposited on an optical substrate 206. In some embodiments, the optical substrate 206 is BK-7 optical glass. In other embodiments, optical substrate 206 may be another type of optical substrate, such as quartz, sapphire, silicon, germanium, zinc selenide, zinc sulfide, or various plastics such as polycarbonate, polymethylmethacrylate (PMMA), polyvinylchloride (PVC), diamond, ceramics, combinations thereof, and the like.

At the opposite end (e.g., opposite the optical substrate 206 in FIG. 2), ICE 202 may include a layer 208 that is generally exposed to the environment of the device or installation, and may be able to detect a sample substance. The number of layers 203, 204 and the thickness of each layer 203, 204 are determined from the spectral attributes acquired from a spectroscopic analysis of a characteristic of the substance being analyzed using a conventional spectroscopic instrument. The spectrum of interest of a given characteristic typically includes any number of different wavelengths. It should be understood that the exemplary ICE 202 in FIG. 2 does not in fact represent any particular characteristic of a given substance, but is provided for purposes of illustration only. Consequently, the number of layers 203, 204 and their relative thicknesses, as shown in FIG. 2, bear no correlation to any particular characteristic. Nor are the layers 203, 204 and their relative thicknesses necessarily drawn to scale, and therefore should not be considered limiting of the present disclosure. Moreover, those skilled in the art will readily recognize that the materials that make up each layer 203, 204 (i.e., Si and $SiO_2$) may vary, depending on the application, cost of materials, and/or applicability of the material to the given substance being analyzed.

In some embodiments, the material of each layer 203, 204 can be doped or two or more materials can be combined in a manner to achieve the desired optical characteristic. In addition to solids, the exemplary ICE 202 may also contain liquids and/or gases, optionally in combination with solids, in order to produce a desired optical characteristic. In the case of gases and liquids, the ICE 202 can contain a corresponding vessel (not shown), which houses the gases or liquids. Exemplary variations of ICE 202 may also include holographic optical elements, gratings, piezoelectric, light pipe, and/or acousto-optic elements, for example, that can create transmission, reflection, and/or absorptive properties of interest.

Layers 203, 204 exhibit different refractive indices. By properly selecting the materials of the layers 203, 204 and their relative thickness and spacing, the ICE 202 may be configured to selectively pass/reflect/refract predetermined fractions of electromagnetic radiation at different wavelengths. Each wavelength is given a predetermined weighting or loading factor. The thickness and spacing of layers 203, 204 may be determined using a variety of approximation methods from the spectrum of the characteristic or analyte of interest. These methods may include inverse Fourier transform (IFT) of the optical transmission spectrum and structuring the ICE 100 as the physical representation of the IFT. The approximations convert the IFT into a structure based on known materials with constant refractive indices.

The weightings that layers 203, 204 of ICE 202 apply at each wavelength are set to the regression weightings described with respect to a known equation, or data, or spectral signature. When electromagnetic radiation interacts with a substance, unique physical and chemical information about the substance may be encoded in the electromagnetic radiation that is reflected from, transmitted through, or radiated from the substance. This information is often referred to as the spectral "fingerprint" of the substance. ICE 202 performs the dot product of the electromagnetic radiation received by ICE 202 and the wavelength dependent transmission function of ICE 202. The wavelength dependent transmission function of the ICE 202 is dependent on the layer material refractive index, the number of layers 203, 204 and the layer thicknesses. The transmission function of ICE 202 is designed to mimic a desired regression vector derived from the solution to a linear multivariate problem targeting a specific component of the sample being analyzed. As a result, the output light intensity of ICE 202 is proportional a dot product of a transmission spectrum of the sample with the regression vector associated with the characteristic of interest. Accordingly, the output light intensity of ICE 202 is a direct indicator of a value of the characteristic of interest of the sample.

Optical computing device 101 employing ICE 202 may be capable of extracting the information of the spectral fingerprint of multiple characteristics or analytes within a substance and converting that information into a detectable output regarding the overall properties of the substance. That is, through suitable configurations of the optical computing devices, electromagnetic radiation associated with characteristics or analytes of interest in a substance can be separated from electromagnetic radiation associated with all other components of the substance in order to estimate the properties of the substance in real-time or near real-time. Accordingly, ICE 202 is able to distinguish and process electromagnetic radiation related to a characteristic or analyte of interest.

Figure 3:
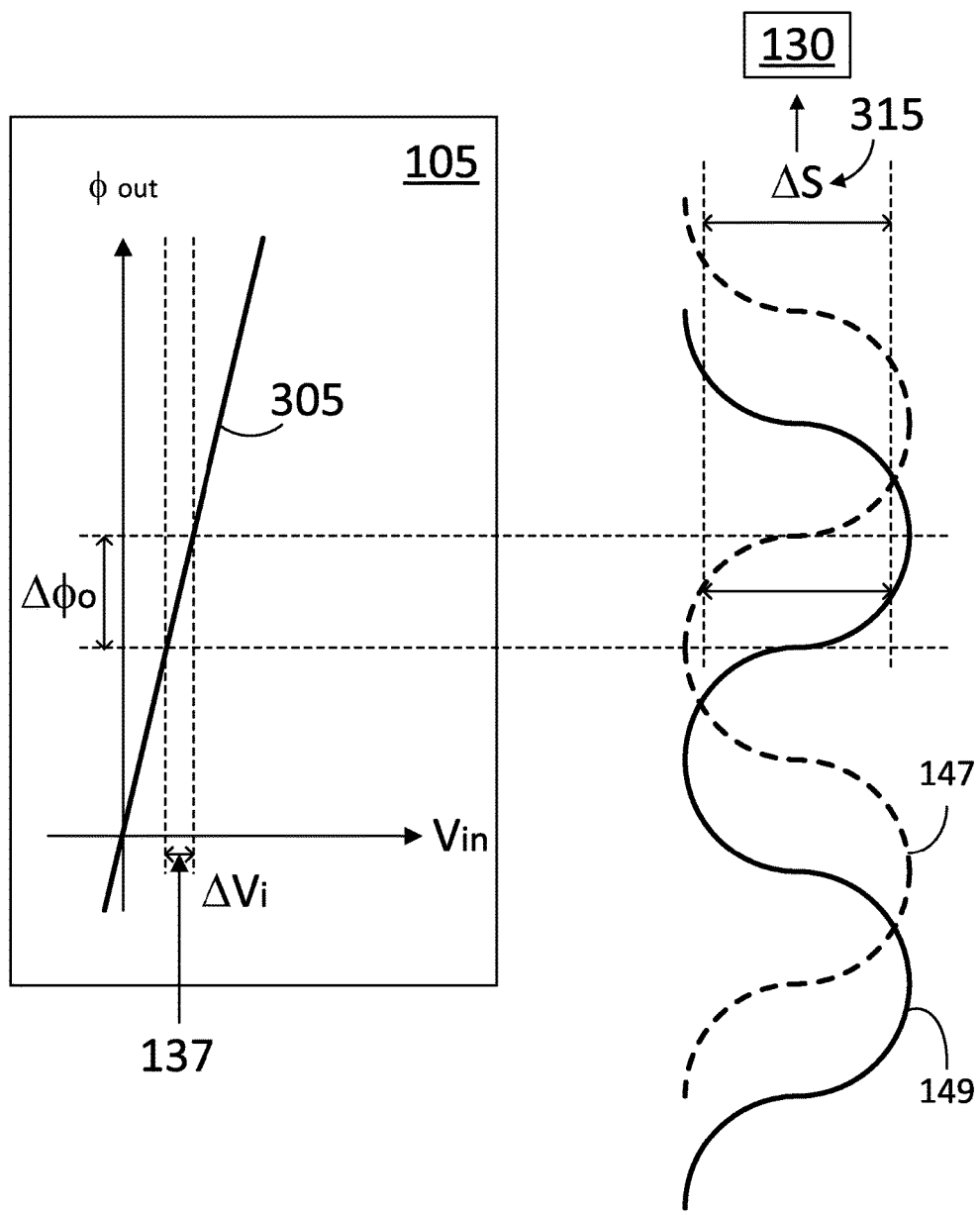
FIG. 3 illustrates a modulation response for an optical link in response to a modulating signal from an optical transducer.

FIG. 3 illustrates a modulation response 305 for optical link 100 in response to modulating signal 137 generated by optical transducer 103. Modulation response 305 is the response function of modulator 105. In some embodiments, modulation response 305 relates an input voltage (cf. $V_{in}$, abscissae in FIG. 3) to a phase output (cf. $\Phi out$, ordinates in FIG. 3). In some embodiments, it is desirable that modulation response 305 be a linear function, as shown in FIG. 3. A value for the voltage range $\Delta Vi$ of optical computing signal 137 results in a modulation output with a phase delay $\Delta \Phi o$ determined by the slope of modulation response 305. The phase delay $\Delta \Phi o$ between first portion 149 and second portion 147 of the transmission light produces an interference signal with an amplitude 315 ($\Delta S$) that is measured by detector 130.

It is desirable that the slope of modulation response 305 be large, so that a small $\Delta Vi$ give rise to a sizeable $\Delta \Phi o$ provided by modulator 105. In some embodiments, it is desirable that the slope of modulation response 305 be sufficiently low to provide ΔΦo at rates enabling the system to demodulate the phase values accurately. More specifically, in some embodiments detector 130 may sample the phase modulated light returned from transducer 103 at a rate of 100 kHz. Accordingly, a sample interval between two consecutive measurements is approximately 10 microseconds—μs—(10 microsecond=$10^{-5}$ s=1/100 kHz). In such configuration, it is desirable that ΔΦo, including any noise generated by optical link 100, be lower than +/−π radians within at least 10 μs. This includes white noise contributions to ΔΦo that may be much faster than 10 μs, or 100 kHz (e.g., 1 MHz or more). For example, a ΔΦo of either +π or −π within approximately 10 μs or less may be indistinguishable to an optical phase demodulator reading the signal from detector 130. In some embodiments, a passive homodyne demodulation scheme may be used to read the signal from detector 130 to mitigate the +/−π ambiguity and reduce harmonic distortion to the measurement of the compound or fluid characteristic associated with ΔVi. Accordingly, some embodiments include a phase generated carrier (PGC) signal wherein ΔΦo between two subsequent samples is lower than π. In some embodiments, it is desirable that ΔΦo be about π/10, or even less. More specifically, in an electro-optic phase modulator having a Vπ of 2.5V, a ΔΦo of π radians (180°) is achieved when a voltage of 2.5V is applied in optical computational signal 137. Assuming a linear response, a ΔΦo of $6\times10^{-3}$ radians is obtained for an optical computational signal 137 of 5 mV. Thus, when the noise floor for detector 130 is about $10^{-6}$ rad/4 Hz, a Signal-to-Noise Ratio (SNR) of approximately 60 dB is obtained. This level of phase modulation can be interrogated and extracted by detector 130 at the surface of an oil and gas rig.

Figure 4A:
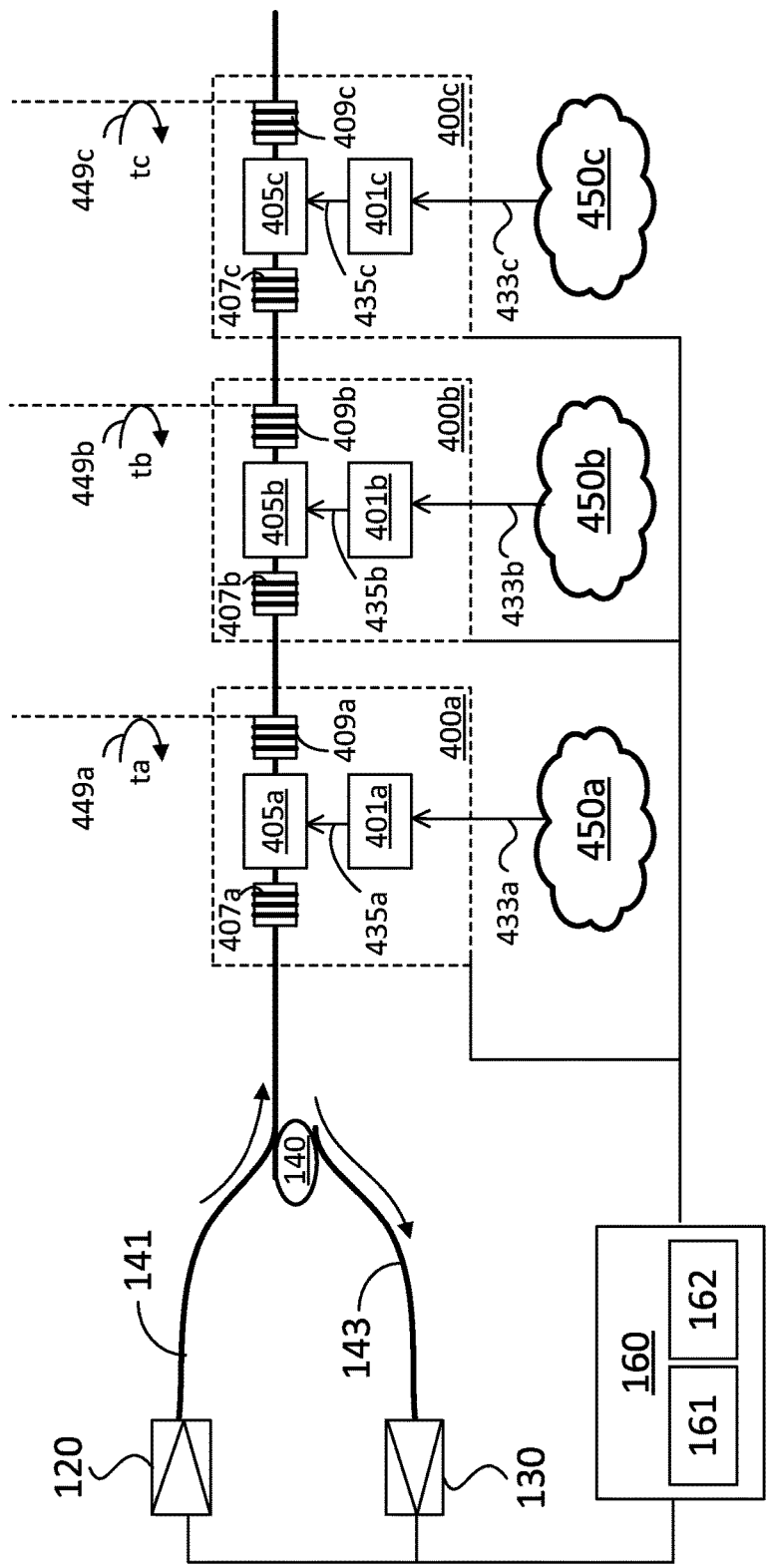
FIG. 4A illustrates a serial time division multiplexing (TDM) coupling of a plurality of optical links.

FIG. 4A illustrates a serial time division multiplexing (TDM) coupling of a plurality of optical links 400a, 400b, and 400c (hereinafter referred to collectively as optical links 400). Each optical link 400 may be associated with a portion of a sample 450a, 450b, and 450c, respectively, hereinafter collectively referred to as sample 450. Samples 450a, 450b, and 450c may be portions of the same sample 450 at different locations, for example, obtained at different points in a borehole, or different points along an oil or gas pipeline.

Each Optical link 400 may include an optical computing device 401a, 401b, and 401c, respectively, hereinafter collectively referred to as optical computing devices 401. Optical computing devices 401 provide an optical computing signal 435a, 435b, and 435c (hereinafter collectively referred to as optical computing signals 435) to each one of modulators 405a, 405b, and 405c (hereinafter collectively referred to as modulators 405), respectively. In some embodiments, optical links 400 are analogous to optical links 100 (cf. FIG. 1). In that regard, each modulator 405 may include a modulator 105 and an optical transducer 103. Moreover, each optical computation devices 401 may be similar to optical computational device 101.

Each one of optical links 400 may include an input coupler 407a, 407b, and 407c, and an output coupler 409a, 409b, and 409c (hereinafter collectively referred to as input couplers 407 and output couplers 409), respectively. Each one of output couplers 409 gives rise to a transmission signal portions 449a, 449b, and 449c (hereinafter collectively referred to as transmission signal portions 449). Transmission signal portions 449 are distinguished between one another in the time, ta, tb, and tc at which they arrive in detector 130 after traveling back through waveguide 141 into splitter 140 and waveguide 143. Accordingly, an interference pattern produced by transmission signal portion 449a, transmission signal portion 449b, and transmission signal portion 449b will be observed by detector 130 at different times ta, tb, and tc. Thus, knowledge of travel times ta, tb, and tc allows controller 160 to determine which one of optical links 400a, 400b, or 400c, gave rise to any given interference pattern in detector 130.

In some embodiments, input optical couplers 407 and output optical couplers 409 may be similar. In some embodiments, the transmission and reflection ratios of input couplers 407a-c, and of output couplers 409a-c may be slightly different so that the expected interference patterns generated from modulators 405a, b, and c, respectively, are of the same or approximately similar magnitude for a comparable modulation.

Figure 4B:
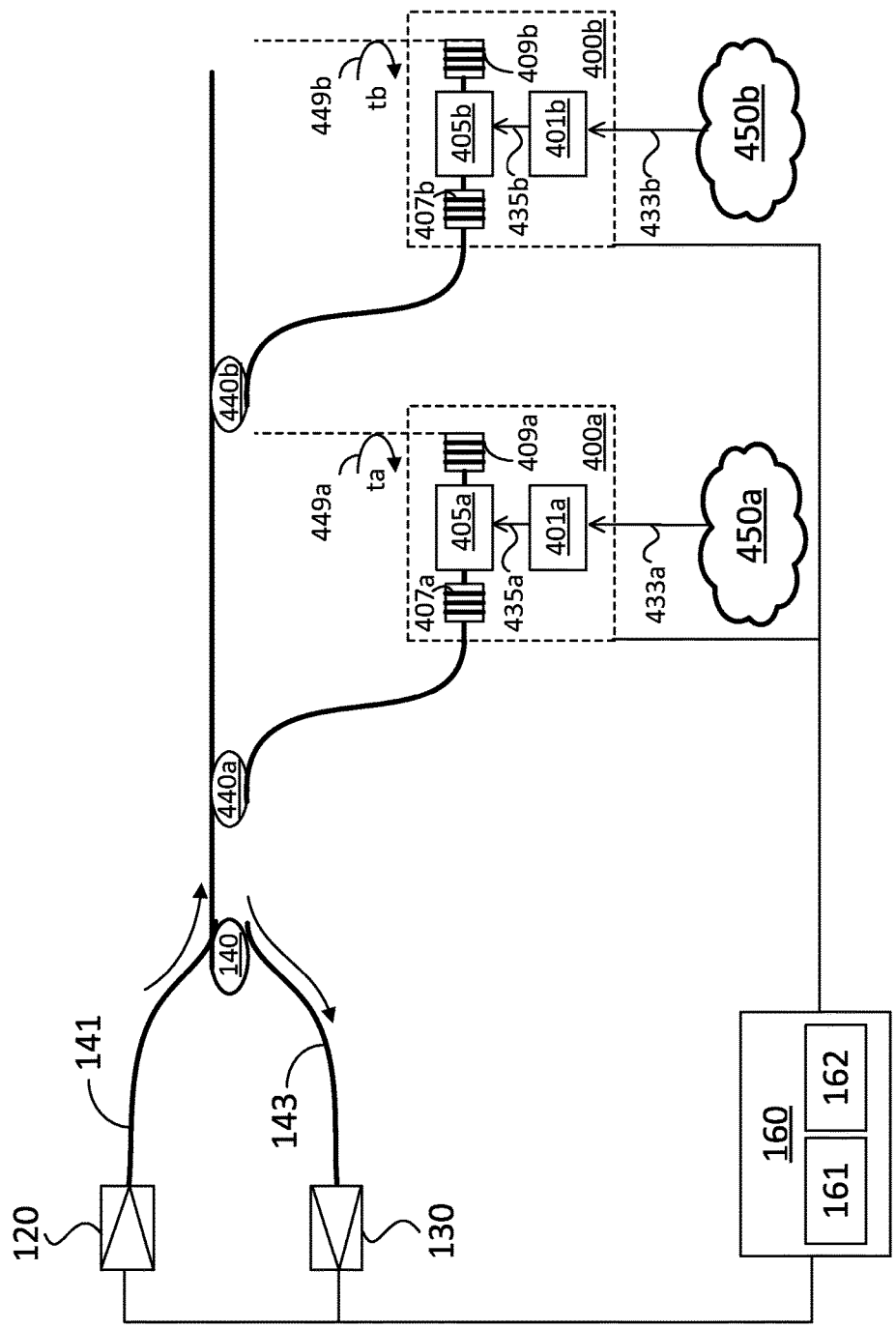
FIG. 4B illustrates a parallel TDM coupling of a plurality of optical links.

FIG. 4B illustrates a parallel TDM coupling of a plurality of optical links. In FIG. 4B, optical links 400a and 400b are coupled in parallel via splitters 440a and 440b (hereinafter collectively referred to as splitters 440). Splitters 440 are selected with low insertion loss. The parallel link embodiment illustrated in FIG. 4B has the advantage of reducing sensor crosstalk due to multiple reflections (e.g. reflections between output coupler 409a and input coupler 407b, cf. FIG. 4A).

In embodiments including a TDM coupling for the plurality of optical links 400a-c, such as illustrated in FIGS. 4A and 4B, the difference between transmission signal portions 449a-c is at least the arrival times ta, tb, and tc at detector 130.

Figure 5A:
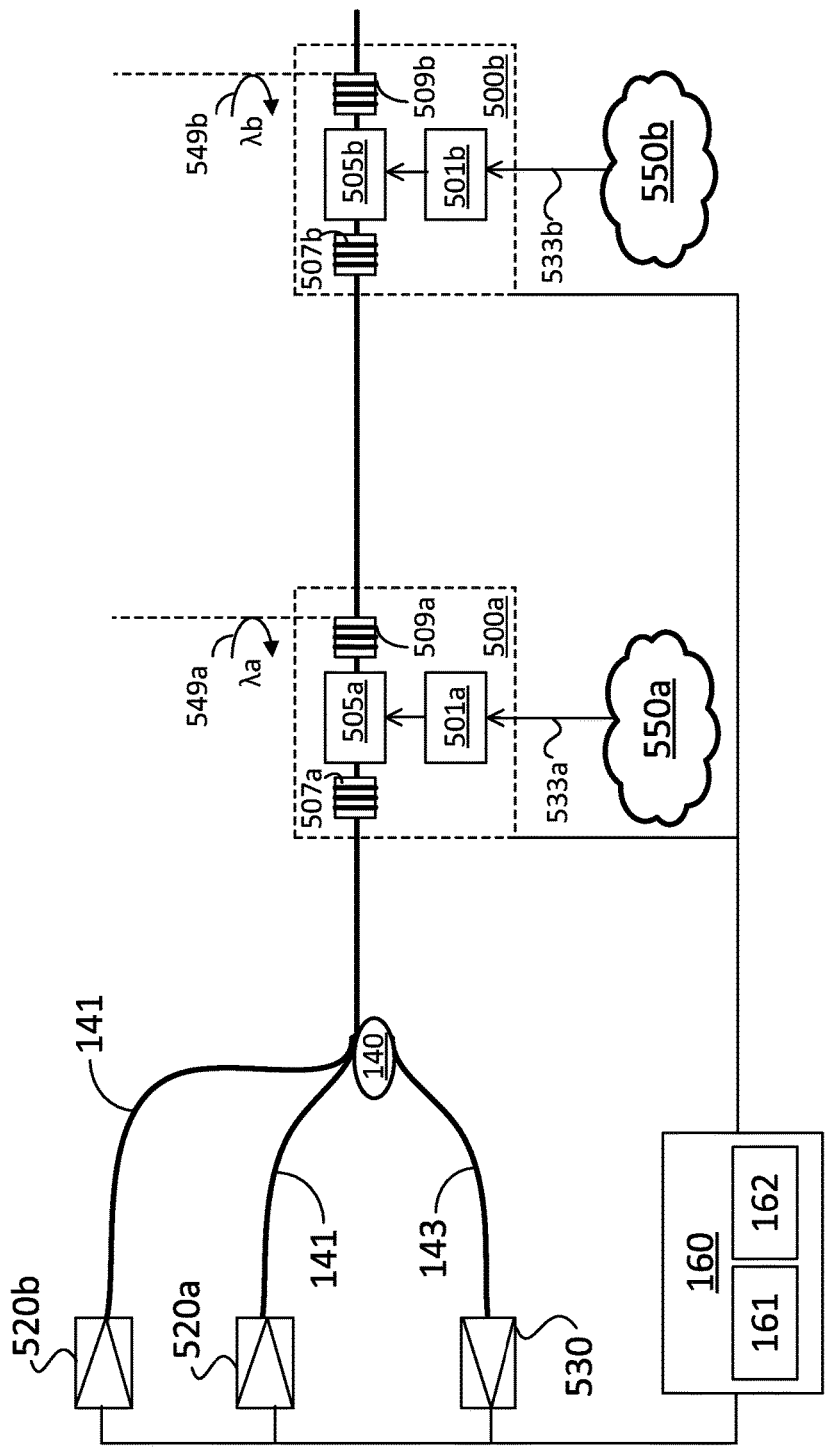
FIG. 5A illustrates a serial wavelength division multiplexing (WDM) coupling of a plurality of optical links.

FIG. 5A illustrates a serial wavelength division multiplexing (WDM) coupling of a plurality of optical links 500a and 500b (hereinafter referred to as optical links 500). Each of optical links 500 is associated with a portion of a sample 550a and 550b (hereinafter collectively referred to as sample 550). Samples 550a and 550b may be portions of the same sample 550 (i.e., same type of fluid or substance) obtained at different locations, for example, at different points in a borehole, or different points along an oil or gas pipeline. Two or more light sources 520a and 520b (hereinafter collectively referred to as light sources 520) emit transmission light at different wavelengths λa and λb, respectively. Light sources 520 may be lasers, such as fiber lasers or external cavity lasers with a coherence length greater than twice the optical path length between reflectors 107 and 109. Wavelengths λa and λb may be two different wavelengths within the same telecommunications band.

Optical links 500 may include optical computing device 501a and 501b (hereinafter collectively referred to as optical computing devices 501) and modulators 505a and 505b (hereinafter collectively referred to as modulators 505). Optical computing devices 501 and modulators 505 may similar to the optical computing devices 101 and 401, and modulators 405 described above (cf. FIGS. 1, and 4A-B). Accordingly, optical links 500a and 500b are similar to optical links 100 and 400 (cf. FIGS. 1 and 4A-B), except that input couplers 507 and output couplers 509 are tuned to only reflect light from a selected wavelength: λa, for input coupler 507a and output coupler 509a; or λb, for input coupler 507b and output coupler 509b.

Transmission light portion 549a has a wavelength λa, and transmission light 549b has a wavelength λb. In some embodiments, detector 530 may be a wavelength sensitive detector that separates transmission light portions 549a and 549b according to wavelength. For example, in some embodiments detector 530 may be similar to detector 130 coupled to a wavelength selective element. The wavelength selective element may be a prism, a diffraction grating, an arrayed waveguide grating (AWG), or a plurality of optical filters. Embodiments consistent with a WDM coupling scheme optimize the use of a telecommunications band e.g., optical link 500a is transparent to all transmission lights carrying wavelengths different from λa. This approach reduces sensor crosstalk at detector 130, and also reduces transmission loss at other wavelengths (e.g., at wavelength λb). In addition, the WDM coupling enables simultaneous, or quasi-simultaneous measurement of multiple optical links 500.

Figure 5B:
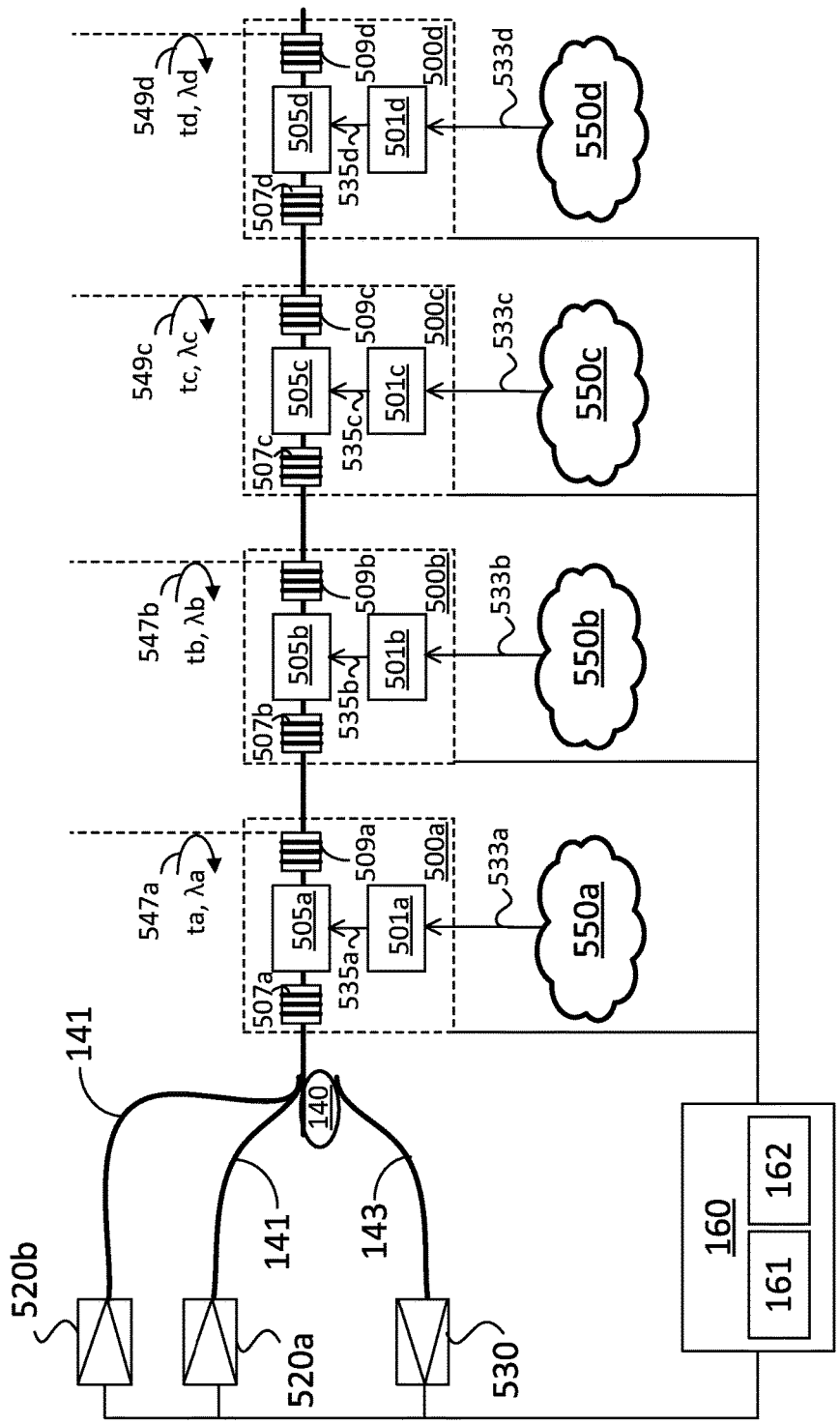
FIG. 5B illustrates a combined serial TDM and serial WDM coupling of a plurality of optical links.

FIG. 5B illustrates a combined serial TDM and serial WDM coupling of a plurality of optical links 500a-d. Optical links 500c and 500d may be associated with a portion of a sample 550c, 550d (hereinafter associated with sample 550). Samples 550c and 550d may be portions of the same sample 550 at different locations, for example different points of a fluid in a borehole, or different points along an oil or gas pipeline.

In embodiments as illustrated in FIG. 5B, optical links 500 may be configured such that transmission light portions 549a and 549c may have the same or similar wavelength (λa~λc), and transmission light portions 549b and 549d may have the same or similar wavelength (λb~λd). Other configurations may include more light sources 520 working at different wavelengths so that, for example, all wavelengths λa, λb, λc and λd are different from one another. Without limitation, it may be desirable to alternate the TDM sequence of optical links 500 according to wavelength to reduce interference and increase the difference in the time of arrival to detector 530. Accordingly, a configuration where λa≠λb, λa~λc, and λb~λd reduces interference between nearest neighbor optical links 500a and 500b, nearest neighbor optical links 500b and 500c, and between nearest neighbor optical links 500c and 500d. In addition, such a configuration increases the difference between to and tc (desirable when λa~λc), and between tb and td (desirable when λb~λd), thus relaxing performance specifications on detector 530.

Figure 6:
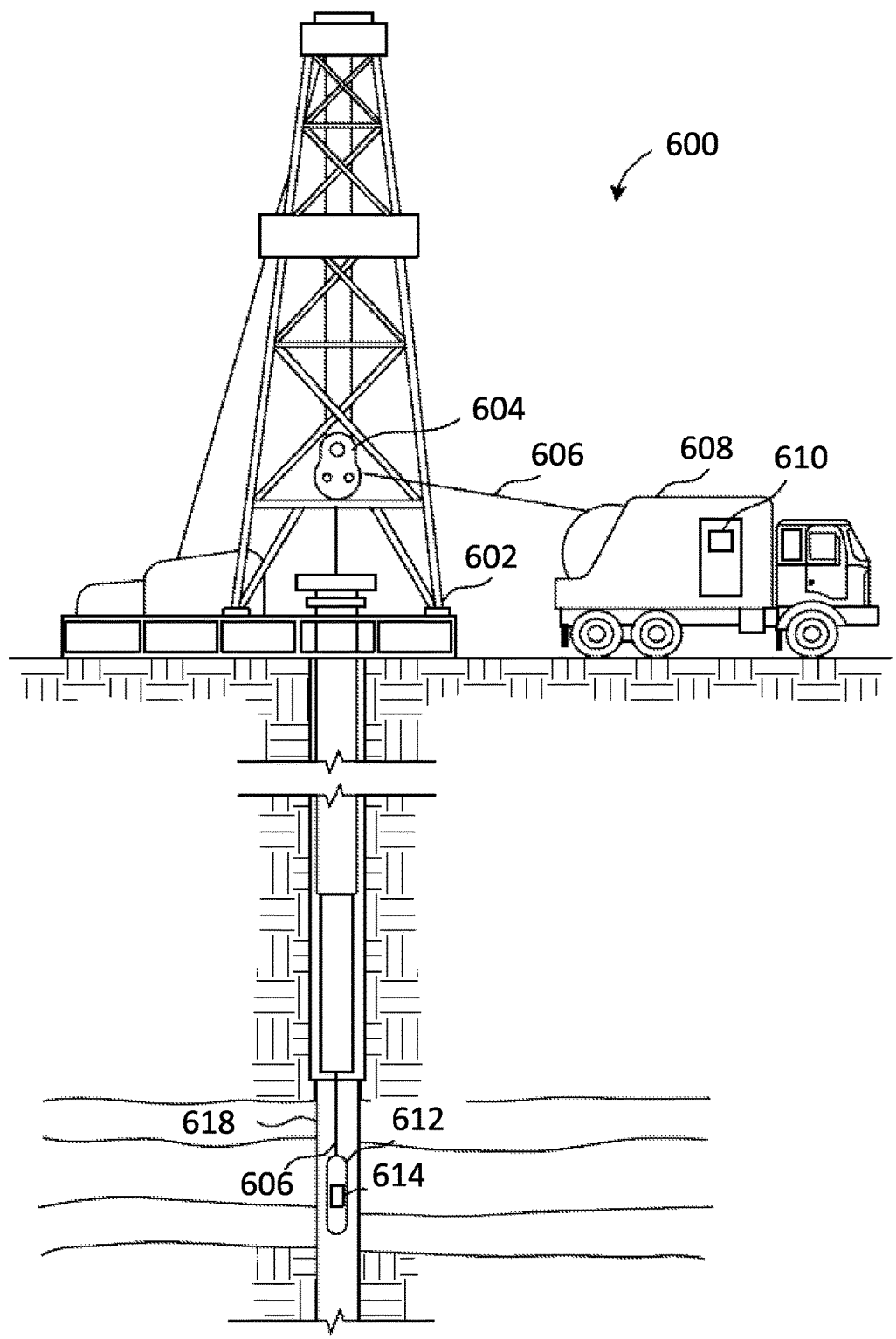
FIG. 6 illustrates a wireline system configured to measure remotely a characteristic of a sample during formation testing and sampling over an optical link.

FIG. 6 illustrates a wireline system 600 configured to measure remotely a characteristic of a sample during formation testing and sampling over an optical link. In some embodiments, wireline system 600 may be configured to use an optical link for a remote measurement of a characteristic of a sample during formation testing and sampling. After drilling of wellbore 618 is complete, it may be desirable to know more details of types of formation fluids and the associated characteristics through sampling with use of wireline formation tester. System 600 may include a wireline logging tool 612 that forms part of a wireline logging operation that can include one or more optical computing devices 614 as described herein (e.g., optical computing devices 100, 400a-c, 500a-d, cf. FIGS. 1, 4A-4B, and 5A-5B, respectively). System 600 may include the derrick 602 that supports the traveling block 604. Wireline logging tool 612, such as a probe or sonde, may be lowered by wireline or logging cable 606 into borehole 618. Tool 612 may be lowered to the bottom of the region of interest and subsequently pulled upward at a substantially constant speed by wireline or logging cable 606. Tool 612 may be configured to measure fluid properties of the wellbore fluids, and any measurement data generated by wireline logging tool 612 and its associated optical computing devices 614 can be communicated to a surface logging facility 608 for storage, processing, and/or analysis. Methods for permanently deploying one or more optical computing devices 614 described herein include clamping the sensors and optical transmission fiber to production tubing deployed within a casing string, or deployment by clamping the sensors and fiber cable to the outside of the casing string. Accordingly, embodiments of a system as disclosed herein may continuously monitor wellbore fluid properties over the life of the well. Any one of optical computing devices 614 may include an ICE according to embodiments disclosed herein (e.g., ICE 202, cf. FIG. 2). Logging facility 608 may be provided with electronic equipment 610, including processors for various types of signal processing.

Figure 7:
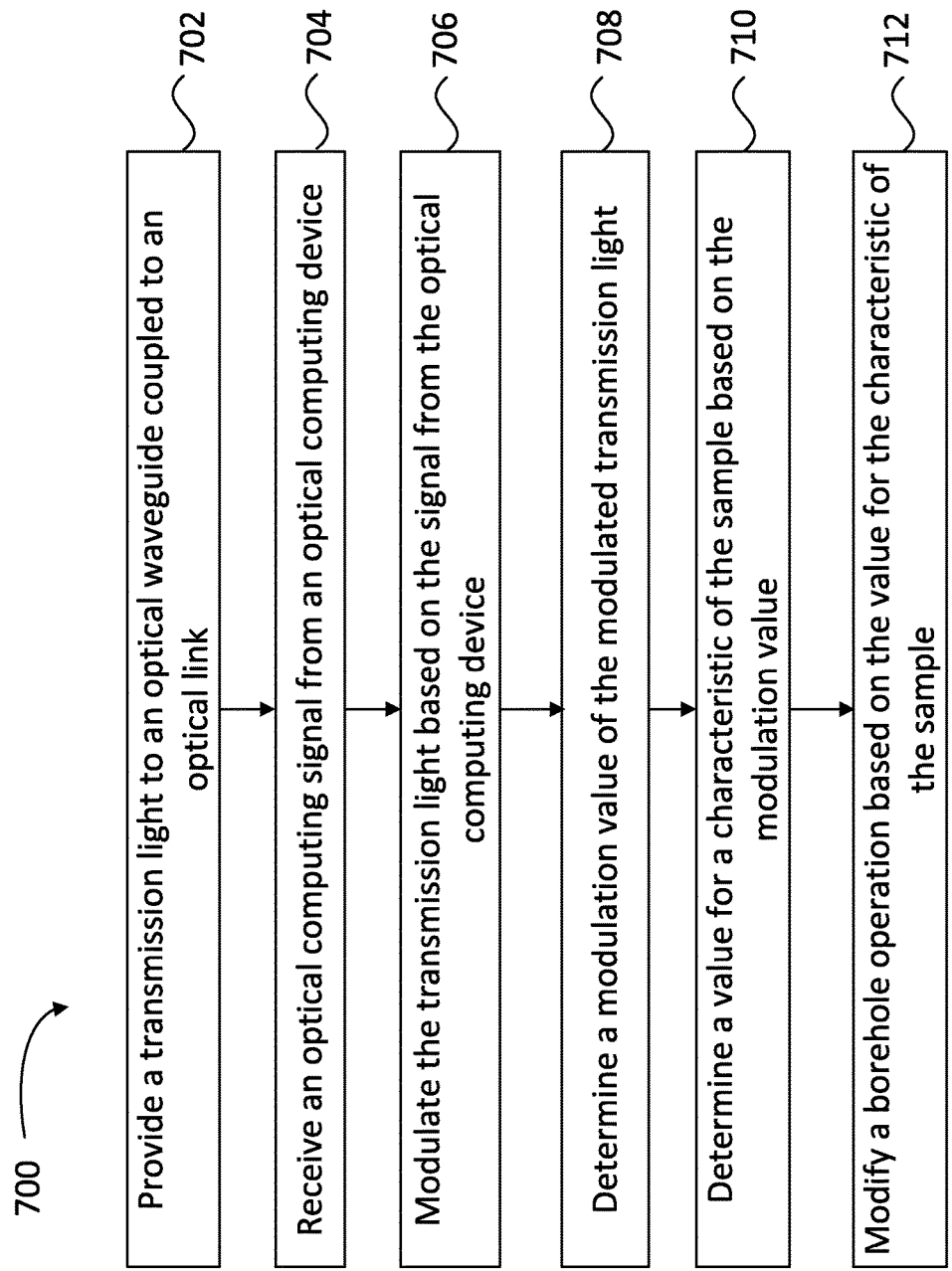
FIG. 7 illustrates a flow chart including steps in a method for remote measurement of a characteristic of a sample over an optical link.

FIG. 7 illustrates a flow chart including steps in a method 700 for remote measurement of a characteristic of a sample over an optical link. In some embodiments, steps in method 700 may be performed at least partially by a controller including a processor and a memory (e.g., controller 160, processor 161, and memory 162, cf. FIG. 1). The memory may store commands that, when executed by the processor, cause the controller to perform at least some of the steps in method 700. Accordingly, methods consistent with method 700 may be performed in connection with a system including an optical link having an input coupler, an output coupler, an optical computing device including an ICE, an optical transducer, and a modulator (e.g., optical link 100, input coupler 107 and output coupler 109, optical computing device 101, ICE 102, optical transducer 103, and modulator 105). Moreover, methods consistent with method 700 may include using a light source to provide a transmission light in a telecommunications wavelength band, a detector, an optical waveguide such as an optical fiber, and a light source to provide an illumination light for the optical computing device (e.g., light source 120, detector 130, optical waveguides 141 and 143, and light source 110, cf. FIG. 1).

Methods consistent with method 700 may include fewer steps than illustrated in FIG. 7 or other steps in addition to at least one of the steps in method 700. Moreover, methods consistent with the present disclosure may include at least one or more of the steps in method 700 performed in a different sequence. For example, some embodiments consistent with the present disclosure may include at least two steps in method 700 performed overlapping in time, or substantially simultaneously in time.

Step 702 includes providing a transmission light to an optical waveguide coupled to an optical link. In some embodiments, step 702 includes providing a plurality of transmission light pulses, each transmission light pulse transmitted at a pre-determined time from an optical source. Accordingly, step 702 may include selecting the pre-determined time according to a travel distance of the plurality of transmission light pulses and the location of the optical link within a plurality of optical links disposed along the optical waveguide. In some embodiments, step 702 includes providing a first transmission light at a first wavelength and a second transmission light at a second wavelength, and selecting the first wavelength and the second wavelength within a telecommunications wavelength band. According to some embodiments, step 702 may include providing a transmission light having a coherence length that is greater than twice an optical path length of the transmission light along the optical link.

Step 704 includes receiving an optical computing signal from an optical computing device in the optical link, the signal being proportional to a characteristic of a sample. In some embodiments, step 704 includes interacting an illumination light with a sample and with an integrated computational element in the optical computing device to form the optical computing signal. Step 706 includes modulating the transmission light in the optical link based on the signal from the optical computing device. Step 706 may include providing a phase retardation to the transmission light based on the optical computing signal.

Step 708 includes determining a modulation value of the modulated transmission light. Step 708 may include coupling the modulated transmission light and an unmodulated transmission light to a detector using a waveguide splitter coupled to the optical waveguide. Step 708 may include detecting an interference between the modulated transmission light and an unmodulated transmission light. In some embodiments, step 708 includes determining a plurality of modulation values of the modulated transmission light received from a plurality of optical links disposed at different locations. Step 710 includes determining a value for the characteristic of the sample based on the modulation value. Accordingly, in some embodiments step 710 includes comparing the modulation value with a linear chart associating a value for the characteristic of the sample with the modulation value. In some embodiments, the value of the characteristic of the sample may not be linearly related to the modulation value, but may be associated with the modulation value via a known formula or mathematical relation.

Step 712 includes modifying a borehole operation based on the modulation value. In some embodiments, step 712 includes determining the location of each of the optical links and associating the value of the characteristic of the sample with the location of each of the optical links. Step 712 may include modifying a borehole operation based on the value for the characteristic of the sample. Accordingly, in some embodiments step 712 includes receiving the value for the characteristic of the sample from a plurality of optical links disposed at different locations along the borehole. Step 712 may include reinforcing certain portions of the borehole or of a pipeline when a measurement indicates corrosion, bacterial contamination, or some other hazardous condition in the borehole or pipeline. In some embodiments, step 712 may include performing a maintenance operation on the borehole or pipeline, such as cleaning a contaminant or particulate.

Embodiments disclosed herein include:

A. A device, including an optical computing device including an integrated computational element (ICE) and providing an optical computing signal proportional to a characteristic of a sample derived from interacted light provided to the ICE. The device further includes an optical transducer that provides a modulating signal based on the optical computing signal and a modulator that modulates a first portion of a transmission light in an optical waveguide based on the modulating signal.

B. A method, including providing a transmission light to an optical waveguide coupled to an optical link and receiving an optical computing signal from an optical computing device in the optical link. In some embodiments, the optical computing signal is proportional to a characteristic of a sample detected by the optical computing device. The method also includes modulating the transmission light in the optical link based on the optical computing signal and thereby obtaining modulated transmission light, determining a modulation value of the modulated transmission light, and determining a value for the characteristic of the sample based on the modulation value.

Each of embodiments A and B may have one or more of the following additional elements in any combination. Element 1: an input coupler that provides the first portion of the transmission light to the modulator and further provides a second portion of the transmission light back to the optical waveguide, and an output coupler that reflects the first portion of the transmission light back through the modulator and out of the device through the input coupler. Element 2: wherein the optical waveguide includes an optical fiber and at least one of the input coupler and the output coupler is a fiber Bragg grating having a partial transmission rate and a partial reflection rate. Element 3: wherein at least one of the input coupler element and the output coupler is a wavelength selective element with a partial reflection rate that is higher for the first portion of the transmission light having a wavelength within a pre-selected band. Element 4: wherein the optical waveguide is an optical fiber having a low loss coefficient in a telecommunications wavelength band, and the transmission light exhibits a wavelength in the telecommunications wavelength band. Element 5: wherein the modulating signal is a voltage and the modulator is an electro-optic phase retarder having an index of refraction that changes according to the voltage. In addition, embodiments A and B may have element 6: wherein the optical transducer includes at least one of an electro-optical transducer or an all-optical transducer.

In addition, embodiments A and B may include element 7: providing a first transmission light at a first wavelength and a second transmission light at a second wavelength and selecting the first wavelength and the second wavelength within a telecommunications wavelength band. Element 8: wherein providing the transmission light includes providing a transmission light having a coherence length that is greater than twice an optical path length of the transmission light along the optical link. Element 9: wherein providing the transmission light includes providing a plurality of transmission light pulses, each transmission light pulse transmitted at a pre-determined time from an optical source. Element 10: further including selecting the pre-determined time according to a travel distance of the plurality of transmission light pulses and the location of the optical link within a plurality of optical links disposed along the optical waveguide. Element 11: wherein modulating the transmission light in the optical link includes providing a phase retardation to the transmission light based on the optical computing signal. Element 12: wherein determining the modulation value of the modulated transmission light includes coupling the modulated transmission light and an unmodulated transmission light to a detector using a waveguide splitter coupled to the optical waveguide. Element 13: wherein determining the modulation value of the modulated transmission light includes detecting an interference between the modulated transmission light and an unmodulated transmission light. Element 14: wherein determining the modulation value of the modulated transmission light includes determining a plurality of modulation values of the modulated transmission light received from a plurality of optical links disposed at different locations. Element 15: further including optically interacting an illumination light with the sample and an integrated computational element positioned in the optical computing device to form the optical computing signal. Element 16: further including determining the location of each of a plurality of optical links and associating the value of the characteristic of the sample with the location of each of the plurality of optical links. Element 17: further including modifying a borehole operation based on the value for the characteristic of the sample. Element 18: wherein modifying the borehole operation includes receiving the value for the characteristic of the sample from a plurality of optical links disposed at different locations along the borehole.

Those skilled in the art will readily appreciate that the methods described herein, or large portions thereof may be automated at some point such that a computerized system may be programmed to transmit data from an optical computing device using an ICE element. Computer hardware used to implement the various methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A device, comprising:
an optical computing device including an integrated computational element (ICE) and providing an optical computing signal proportional to a characteristic of a sample derived from interacted light provided to the ICE;
an optical transducer that provides a modulating signal based on the optical computing signal;
a modulator that modulates a first portion of a transmission light in an optical waveguide based on the modulating signal;
an input coupler that provides the first portion of the transmission light to the modulator and further provides a second portion of the transmission light back to the optical waveguide; and
an output coupler that reflects the first portion of the transmission light back through the modulator and out of the device through the input coupler.

2. The device of claim 1, wherein the optical waveguide includes an optical fiber and at least one of the input coupler and the output coupler is a fiber Bragg grating having a partial transmission rate and a partial reflection rate.

3. The device of claim 1, wherein at least one of the input coupler and the output coupler is a wavelength selective element with a partial reflection rate that is higher for the first portion of the transmission light having a wavelength within a pre-selected band.

4. The device of claim 1, wherein the optical waveguide is an optical fiber having a low loss coefficient in a telecommunications wavelength band, and the transmission light exhibits a wavelength in the telecommunications wavelength band.

5. The device of claim 1, wherein the modulating signal is a voltage and the modulator is an electro-optic phase retarder having an index of refraction that changes according to the voltage.

6. The device of claim 1, wherein the optical transducer includes at least one of an electro-optical transducer or an all-optical transducer.

7. A method, comprising:
providing a transmission light to an optical waveguide coupled to an optical link, wherein the transmission light comprises multiple transmission light pulses transmitted at a pre-determined time from an optical source;

selecting the pre-determined time according to a travel distance of the transmission light pulses and a location of the optical link within a plurality of optical links disposed along the optical waveguide;

receiving an optical computing signal from an optical computing device in the optical link, the optical computing signal being proportional to a characteristic of a sample detected by the optical computing device;

modulating the transmission light in the optical link based on the optical computing signal and thereby obtaining modulated transmission light;

determining a modulation value of the modulated transmission light; and determining a value for the characteristic of the sample based on the modulation value.

8. The method of claim 7, wherein providing the transmission light includes:

providing a first transmission light at a first wavelength and a second transmission light at a second wavelength; and selecting the first wavelength and the second wavelength within a telecommunications wavelength band.

9. The method of claim 7, wherein providing the transmission light includes providing a transmission light having a coherence length that is greater than twice an optical path length of the transmission light along the optical link.

10. The method of claim 7, wherein modulating the transmission light in the optical link includes providing a phase retardation to the transmission light based on the optical computing signal.

11. The method of claim 7, wherein determining the modulation value of the modulated transmission light includes coupling the modulated transmission light and an unmodulated transmission light to a detector using a waveguide splitter coupled to the optical waveguide.

12. The method of claim 7, wherein determining the modulation value of the modulated transmission light includes detecting an interference between the modulated transmission light and an unmodulated transmission light.

13. The method of claim 7, wherein determining the modulation value of the modulated transmission light includes determining a plurality of modulation values of the modulated transmission light received from a plurality of optical links disposed at different locations.

14. The method of claim 7, further including optically interacting an illumination light with the sample and an integrated computational element positioned in the optical computing device to form the optical computing signal.

15. The method of claim 7, further including determining the location of each of a plurality of optical links and associating the value of the characteristic of the sample with the location of each of the plurality of optical links.

16. The method of claim 7, further including modifying a borehole operation based on the value for the characteristic of the sample.

17. The method of claim 16, wherein modifying the borehole operation includes receiving the value for the characteristic of the sample from a plurality of optical links disposed at different locations along a borehole.

* * * * *